US010115235B2

(12) United States Patent
Inomata

(10) Patent No.: US 10,115,235 B2
(45) Date of Patent: Oct. 30, 2018

(54) METHOD FOR CONTROLLING HEAD MOUNTED DISPLAY, AND SYSTEM FOR IMPLEMETING THE METHOD

(71) Applicant: COLOPL, INC., Tokyo (JP)

(72) Inventor: Atsushi Inomata, Kanagawa (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/264,529

(22) Filed: Sep. 13, 2016

(65) Prior Publication Data
US 2017/0098330 A1  Apr. 6, 2017

(30) Foreign Application Priority Data

Jul. 14, 2015 (JP) ................................ 2015-140224

(51) Int. Cl.
*G06T 19/00* (2011.01)
*G06T 7/00* (2017.01)
*G06T 17/10* (2006.01)
*G06T 15/04* (2011.01)
(Continued)

(52) U.S. Cl.
CPC ............ *G06T 19/006* (2013.01); *G06F 3/012* (2013.01); *G06T 7/0081* (2013.01); *G06T 7/20* (2013.01); *G06T 15/04* (2013.01); *G06T 17/10* (2013.01); *G06T 2207/20112* (2013.01); *G06T 2207/30242* (2013.01)

(58) Field of Classification Search
CPC ........ G06F 3/011; G06F 3/012; G06T 19/006; G06T 15/04; G06T 17/10; G06T 7/20; G06T 2207/20112; G06T 2207/30242

See application file for complete search history.

(56) References Cited

U.S. PATENT DOCUMENTS

| 6,346,929 B1 | 2/2002 | Fukushima et al. |
| 6,940,505 B1 * | 9/2005 | Savine ................... G06T 17/20 345/419 |
| 2005/0003891 A1 | 1/2005 | Serizawa et al. |

(Continued)

FOREIGN PATENT DOCUMENTS

| JP | 8-6708 A | 1/1996 |
| JP | 8-305892 A | 11/1996 |

(Continued)

OTHER PUBLICATIONS

Foley et al. (Foley, James, et al., "Computer Graphics: Principles and Practice", Second edition in C, Addison-Wesley Publishing Co., 1996).*

(Continued)

*Primary Examiner* — William A Beutel
(74) *Attorney, Agent, or Firm* — Hauptman Ham, LLP

(57) ABSTRACT

A method for controlling an immersive head mounted display configured to provide a virtual space to a user. The method includes generating a virtual space image that forms a virtual space viewable by the user. The method further includes determining a reference line of sight. The method further includes determining a field-of-view region of the virtual space based on the reference line of sight. The method further includes generating a region of the virtual space image corresponding to the field-of-view region as a field-of-view image having an image quality higher than an image quality of a different portion of the virtual space image.

11 Claims, 10 Drawing Sheets

(51) Int. Cl.
*G06T 7/20* (2017.01)
*G06F 3/01* (2006.01)

(56) References Cited

U.S. PATENT DOCUMENTS

| | | | |
|---|---|---|---|
| 2008/0036875 A1* | 2/2008 | Jones | H04N 5/23238 348/222.1 |
| 2011/0244958 A1 | 10/2011 | Nimura et al. | |
| 2012/0105473 A1* | 5/2012 | Bar-Zeev | G06T 7/70 345/633 |
| 2012/0154277 A1* | 6/2012 | Bar-Zeev | G02B 27/017 345/158 |
| 2015/0235433 A1* | 8/2015 | Miller | G06T 19/006 345/633 |
| 2015/0287158 A1* | 10/2015 | Cerny | G06F 3/013 345/553 |
| 2016/0012855 A1* | 1/2016 | Krishnan | G11B 27/105 386/241 |
| 2016/0131908 A1* | 5/2016 | Fateh | G06F 3/147 345/633 |
| 2016/0274365 A1* | 9/2016 | Bailey | G02B 27/0093 |

FOREIGN PATENT DOCUMENTS

| | | |
|---|---|---|
| JP | 11-175758 A | 7/1999 |
| JP | 2004-13326 A | 1/2004 |
| JP | 2011-215918 A | 10/2011 |
| JP | 2013-258614 A | 12/2013 |
| JP | 2014-10805 A | 1/2014 |

OTHER PUBLICATIONS

Office Action in JP Application No. 2015-140224, dated Feb. 1, 2016, for which an explanation of relevance is attached.
Office Action in JP Application No. 2015-140224, dated Apr. 26, 2016, for which an explanation of relevance is attached.
Yuichiro Hayakawa et al., "A Proposal of Realtime Latency Measurement and Ex Post Facto Lag Compensation For Head Mounted Display" Journal of the Virtual Reality Society of Japan, Mar. 31, 2014, p. 47-p. 54, vol. 19, No. 1 (consecutive No. 71), The Virtual Reality Society of Japan.
"Make material for DTP using Carrara 3D Basics" in DTP+3DCG Cooking Book, Professional DTP, Dec. 1, 2003, p. 106-p. 109, 1st edition, Kohgaku-Sha Co., Ltd.
"Texture reproduction in CG", Research Report on the high quality texture video, Apr. 16, 2009, p. 86-p. 90, The Japan Machinery Federation, Digital Content Association of Japan.
"Nippon Telegraph and Telephone (NTT) and DWANGO has developed a delivery technology to view a 360-degree image of nicofarre in HMD", Network News by AV Watch, Feb. 4, 2014, http://av.watch.impress.co.jp/docs/news/633728.html.

* cited by examiner

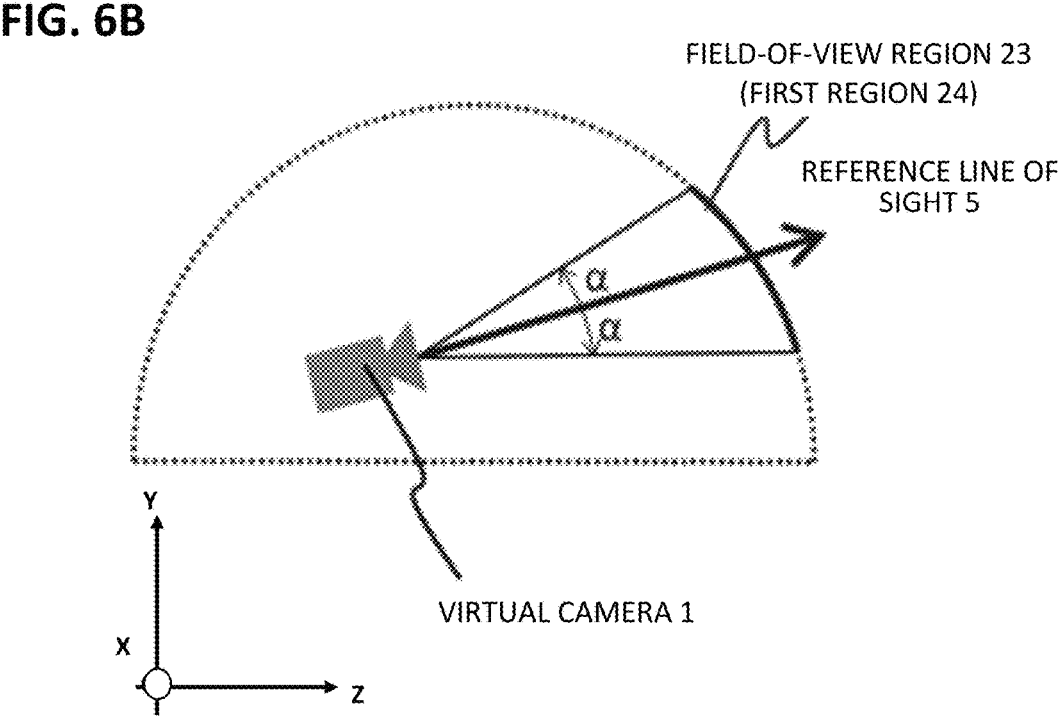
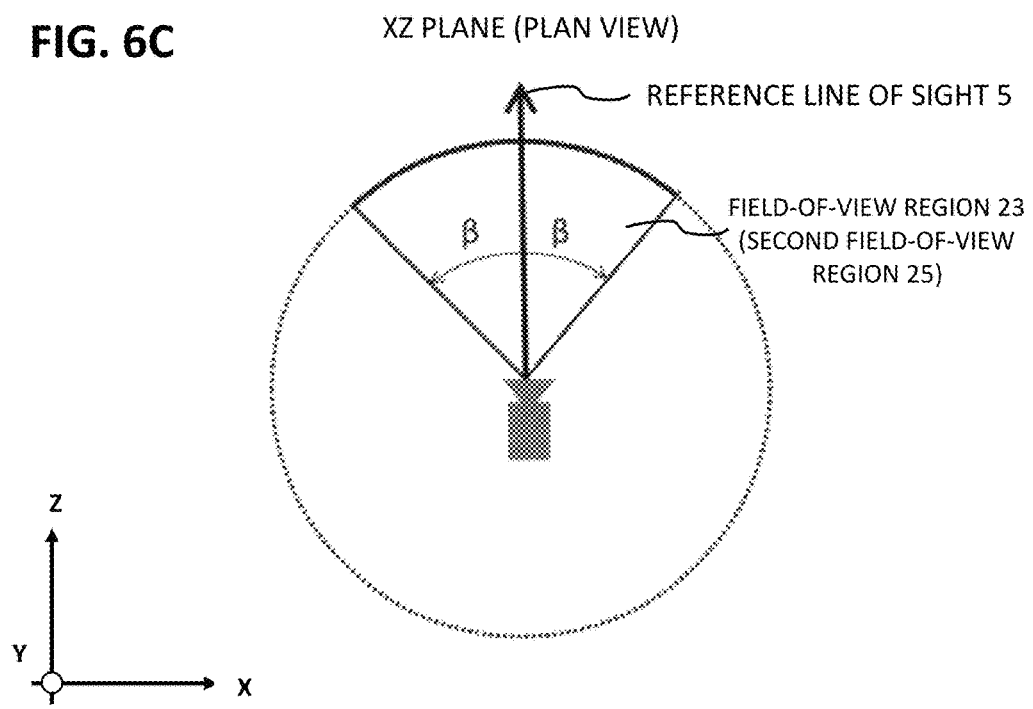

VIRTUAL SPACE IMAGE 22
FIELD-OF-VIEW REGION 23
FIELD-OF-VIEW IMAGE 26

DIRECTION IN WHICH REFERENCE LINE OF SIGHT MOVES

FIELD-OF-VIEW IMAGE 26

UPDATE POSITION 29

O

METHOD FOR CONTROLLING HEAD MOUNTED DISPLAY, AND SYSTEM FOR IMPLEMETING THE METHOD

RELATED APPLICATIONS

The present application claims priority to Japanese Application Number 2015-140224, filed Jul. 14, 2015, the disclosure of which is hereby incorporated by reference herein in its entirety.

TECHNICAL FIELD

This disclosure relates to a method for controlling a head mounted display, and a system for implementing the method.

BACKGROUND ART

In Patent Literature 1, there is disclosed a head mounted display (HMD) which is wearable on a head of a user and configured to display a right-eye image and a left-eye image for a right eye and a left eye of the user, respectively, to thereby provide a three-dimensional virtual space to the user. Further, in Patent Literature 2, it is disclosed that, as a method of updating a three-dimensional virtual space image in real time based on change in point of view of a user wearing an HMD, a real-time rendering method is employed.

[Patent Literature 1] Japanese Patent Application Laid-open No. Hei 8-006708

[Patent Literature 2] Japanese Patent Application Laid-open No. 2004-013326

SUMMARY

In order to provide a three-dimensional virtual space image, a right-eye image and a left-eye image are generated. Therefore, when the three-dimensional virtual space image is provided in high image quality, a rendering load for generating each image is increased. The increase in rendering load becomes particularly noticeable when the three-dimensional virtual space image is updated in real time based on a change in a point of view of the user. This disclosure helps to reduce the rendering load when the three-dimensional virtual space image is provided.

According to this disclosure, there is provided a method for controlling an immersive head mounted display (hereinafter referred to as "HMD") configured to provide a virtual space to a user. The method includes generating a virtual space image that forms a virtual space to which the user is immersed. The method further includes determining a reference line of sight. The method further includes determining a field-of-view region of the virtual space, which is visually recognized by the user, based on the reference line of sight. The method further includes generating a region of the virtual space image corresponding to the field-of-view region as a field-of-view image having an image quality higher than an image quality of the virtual space image.

Further, according to this disclosure, there is provided a method for controlling an HMD configured to provide a virtual space to a user. The method includes generating a virtual space image that forms a virtual space to which the user is immersed. The method further includes determining a reference line of sight. The method further includes determining a field-of-view region of the virtual space, which is visually recognized by the user, based on the reference line of sight. The method further includes generating a region of the virtual space image corresponding to the field-of-view region as a field-of-view image, in which, when a position of the user in the virtual space arrives at an update position, the virtual space image is updated, and a region of the updated virtual space image corresponding to the field-of-view region is generated as the field-of-view image.

According to this disclosure, the rendering load when the three-dimensional virtual space image is provided is reduced.

BRIEF DESCRIPTION OF THE DRAWING

FIG. 6B A YZ plane view for illustrating the field-of-view region as viewed from an X direction.

FIG. 6C An XZ plane view for illustrating the field-of-view region as viewed from a Y direction.

DETAILED DESCRIPTION

Figure 1:
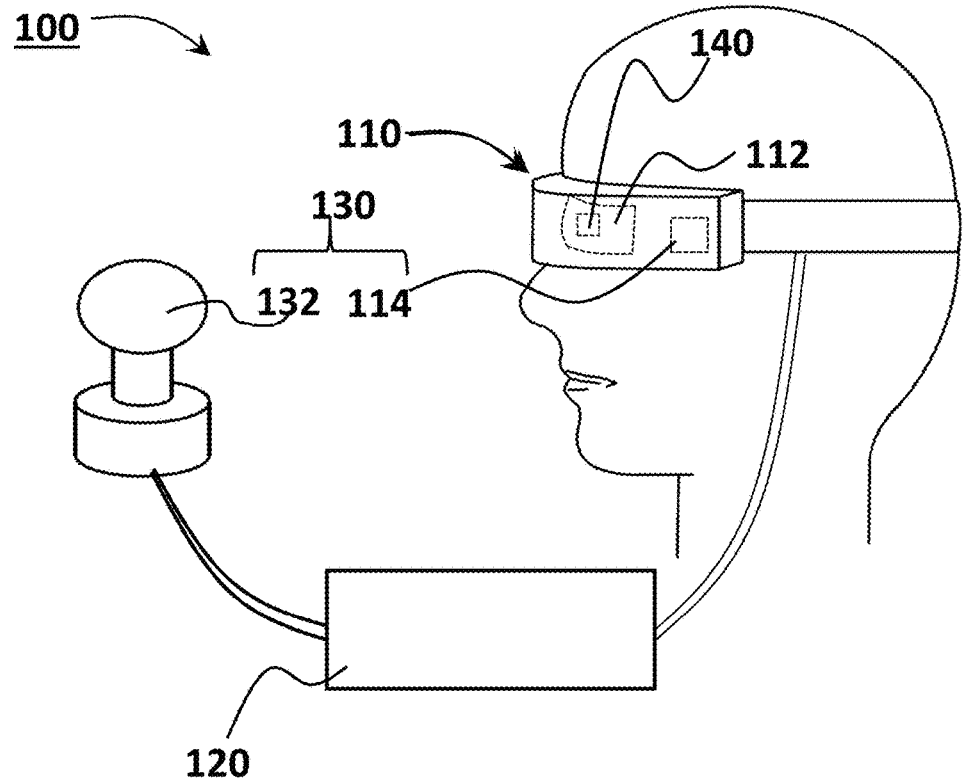
FIG. 1 A view of an HMD system according to at least one embodiment of this disclosure.

First, at least one embodiment of this disclosure is described by enumerating contents thereof. A method for controlling an HMD and a system for implementing the method according to at least one embodiment of this disclosure include the following configurations.

(Item 1)

A method for controlling an HMD configured to provide a virtual space to a user. The method includes generating a virtual space image that forms a virtual space to which the user is immersed. The method further includes determining a reference line of sight. The method further includes determining a field-of-view region of the virtual space, which is visually recognized by the user, based on the reference line of sight. The method further includes generating a region of the virtual space image corresponding to the field-of-view region as a field-of-view image having an image quality higher than an image quality of the virtual space image.

According to the method for controlling an HMD of this item, the virtual space image is generated in advance in a low image quality, and then the part of the virtual space image corresponding to the user's field-of-view region is generated as a field-of-view image having a high image quality. Thus, rendering resources can be concentrated on the part of the virtual space image corresponding to the user's field-of-view region. With this, the rendering load when the three-dimensional virtual space image is provided may be reduced.

(Item 2)

A method for controlling an HMD according to Item 1, further including detecting a direction in which the reference line of sight moves.

When the field-of-view region moves from a first part to a second part of the virtual space image due to movement of the reference line of sight, the field-of-view image is generated in the second part before completion of movement of the field-of-view region.

According to the method for controlling an HMD of this item, before completion of the movement of the field-of-view region, the field-of-view image of the region is generated. Thus, the user may always visually recognize a virtual space having a high image quality. With this, the user experience may be improved.

(Item 3)

A method for controlling an HMD according to Item 1, in which the field-of-view image is generated so as to cover a predetermined region around the field-of-view region.

According to the method for controlling an HMD of this item, the field-of-view image covers the field-of-view region. Thus, generation of the field-of-view image of the field-of-view region before completion of the movement of the field-of-view region is facilitated. With this, the user experience may be improved.

(Item 4)

A method for controlling an HMD according to Item 3, further including a step of detecting a direction in which the reference line of sight moves.

The predetermined region is set so as to be increased toward the direction in which the reference line of sight moves.

According to the method for controlling an HMD of this item, a region in which the field-of-view image is generated outside of the field-of-view region is set large in the direction in which the reference line of sight moves. Thus, generation of the field-of-view image of the field-of-view region before completion of the movement of the field-of-view region is facilitated.

(Item 5)

A method for controlling an HMD according to any one of Items 1 to 4, when a position of the user in the virtual space arrives at an update position, the virtual space image is updated.

A region of the updated virtual space image corresponding to the field-of-view region is generated as a field-of-view image having an image quality higher than the image quality of the virtual space image.

According to the method for controlling an HMD of this item, when the position of the user in the virtual space arrives at the update position, the virtual space image is collectively updated. With this, the virtual space image may be generated efficiently, and the rendering load may be reduced.

(Item 6)

A method for controlling an HMD configured to provide a virtual space to a user. The method includes generating a virtual space image that forms a virtual space to which the user is immersed. The method further includes determining a reference line of sight. The method further includes determining a field-of-view region of the virtual space, which is visually recognized by the user, based on the reference line of sight. The method further includes generating a region of the virtual space image corresponding to the field-of-view region as a field-of-view image. When a position of the user in the virtual space arrives at an update position, the virtual space image is updated, and a region of the updated virtual space image corresponding to the field-of-view region is generated as the field-of-view image.

According to the method for controlling an HMD of this item, when the position of the user in the virtual space arrives at the update position, the virtual space image is collectively updated. With this, the virtual space image may be generated efficiently, and the rendering load may be reduced.

(Item 7)

A program for controlling an HMD, which causes a computer to execute the method for controlling an HMD of any one of Items 1 to 6.

With this, an intuitive operational feeling can be provided to the user.

Specific examples of a method for controlling an HMD and a program for controlling an HMD according to at least one embodiment of this disclosure are described below with reference to the drawings. This disclosure is not limited to those examples, and is defined by Scope of Claims. This disclosure includes modifications within Scope of Claims and the equivalents thereof. In the following description, like elements are denoted by like reference symbols in the description of the drawings, and redundant description thereof is omitted.

FIG. 1 is an illustration of an HMD system 100 including an HMD 110 according to at least one embodiment. The HMD system 100 includes the HMD 110 to be worn on a head of a user, a control circuit unit 120, an inclination sensor 130, and an eye gaze sensor 140.

The HMD 110 includes a display 112 that is a non-transmissive display device, a sensor unit 114, and the eye gaze sensor 140. In at least one embodiment, display 112 is partially transmissive. The control circuit unit 120 is configured to cause the display 112 to display a right-eye image and a left-eye image, to thereby provide a three-dimensional image using binocular parallax as a virtual space. The display 112 is arranged right in front of the user's eyes, and thus the user can be immersed to the virtual space. The virtual space includes a background, various objects that can be operated by the user, menu images, and the like.

The display 112 may include a right-eye sub-display configured to provide a right-eye image, and a left-eye sub-display configured to provide a left-eye image. Further, as long as the right-eye image and the left-eye image can be provided, the display 112 may be constructed of one display device. For example, a shutter configured to enable recognition of a display image with only one eye may be switched at high speed, to thereby independently provide the right-eye image and the left-eye image.

The eye gaze sensor 140 has an eye tracking function of detecting line-of-sight directions of the user's right and left eyes. In at least one embodiment, the eye gaze sensor 140 includes a right-eye sensor and a left-eye sensor, which are respectively configured to detect the line-of-sight directions of the right and left eyes, to thereby detect a direction in which the user focuses his/her gaze. The eye gaze sensor 140 can employ a known sensor having an eye tracking function. For example, infrared light may be radiated to each of the right eye and the left eye to acquire reflection light from the cornea or the iris, to thereby obtain a rotational angle of the eyeball.

The control circuit unit 120 is a computer to be connected to the HMD 110, and is configured to provide the virtual space to the display 112, to thereby execute processing so as to operate various objects displayed in the virtual space or display and control various menu images and the like. The control circuit unit 120 stores a program for controlling execution of such operations. The control circuit unit 120 is not required to be mounted on the HMD 110, and may be constructed as separate hardware (for example, a known personal computer, or a server computer via a network). Further, in at least one embodiment, only a part of the functions of the control circuit unit 120 is mounted on the HMD 110, and the remaining functions thereof are mounted on different hardware.

The inclination sensor 130 is configured to detect information relating to a position and movement of the HMD 110. The inclination sensor 130 includes the sensor unit 114 and a detection unit 132. The sensor unit 114 may include a plurality of light sources. The light source is, for example, an LED configured to emit an infrared ray. The detection unit 132 is, for example, an infrared sensor, and is configured to detect the infrared ray from the light source as a detection point of the HMD 110, to thereby detect over time information relating to an angle in a real space of the HMD 110 based on the movement of the user. Then, the time change of the angle of the HMD 110 can be detected based on the temporal change of the information detected by the detection unit 132, and thus information relating to the position and the movement of the HMD 110 can be detected.

Figure 2:
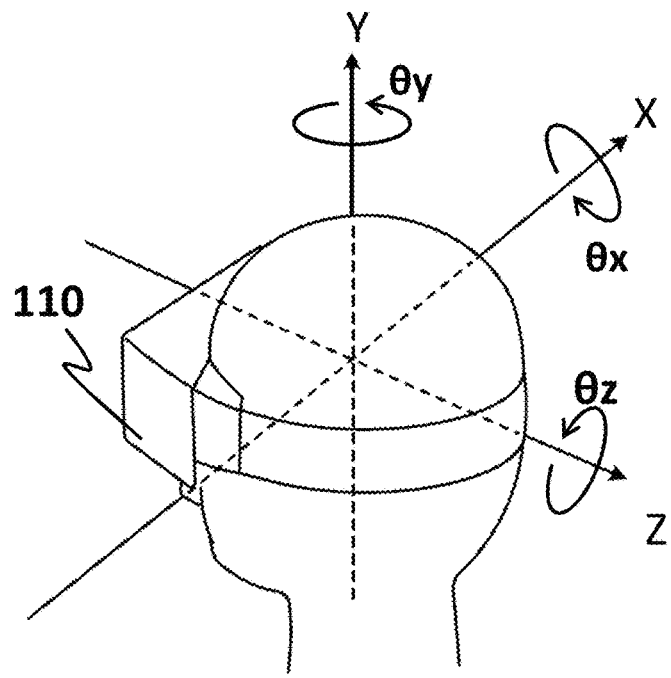
FIG. 2 An illustration of an orthogonal coordinate system on a three-dimensional space defined about a head of a user wearing an HMD.

The information relating to the angle acquired by the inclination sensor 130 is described with reference to FIG. 2. The XYZ axes are defined about the head of the user wearing the HMD 110. A perpendicular direction in which the user stands upright is defined as the Y axis, a front-rear direction being orthogonal to the Y axis and connecting between the user and the center of the display 112 is defined as the Z axis, and a lateral direction orthogonal to the Y axis and the Z axis is defined as the X axis. Then, inclination angles θx (so-called pitch angle), θy (so-called yaw angle), and θz (so-called roll angle) of the HMD 110 about the respective axes are detected. Thus, the information relating to the position and the movement of the HMD 110 can be detected based on the temporal change of those angles.

In at least one embodiment, the inclination sensor 130 is constructed of only one of the detection unit 132 and the sensor unit 114 fixed near the display 112. In at least one embodiment, the sensor unit 114 includes a geomagnetic sensor, an acceleration sensor, or an angular velocity sensor (gyroscope), and is configured to use at least one of those sensors to detect the inclination of the HMD 110 (in particular, the display 112) worn on the head of the user. With this, the information relating to the position and the movement of the HMD 110 can be detected. For example, the angular velocity sensor can detect over time the angular velocity about three axes of the HMD 110 based on the movement of the HMD 110, and can determine the time change of the angle (inclination) about each axis. In this case, the detection unit 132 may be omitted. Further, the detection unit 132 may include an optical camera. In this case, the information relating to the position and the movement of the HMD 110 can be detected based on the image information, and thus the sensor unit 114 is omitted, in at least one embodiment.

Figure 3A:
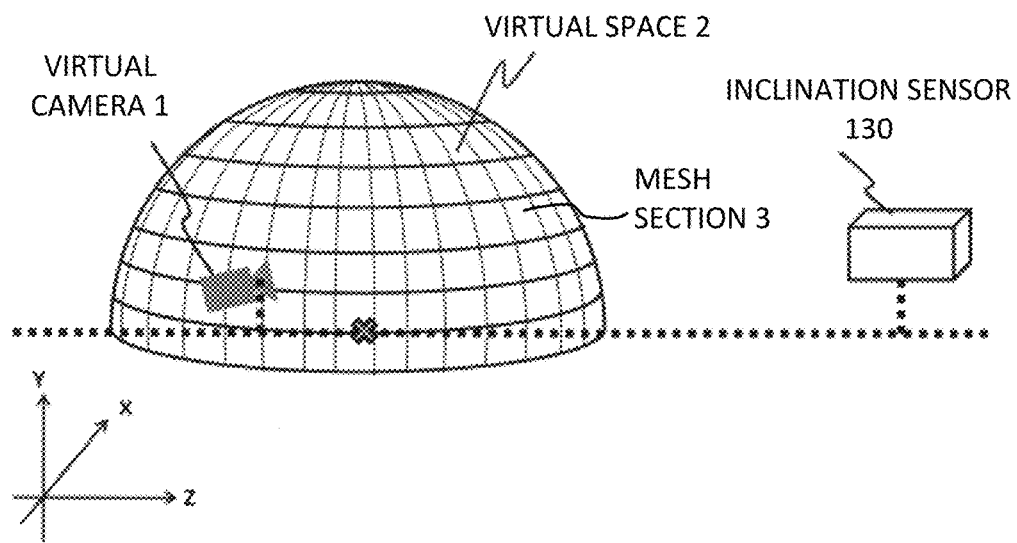
FIG. 3A An XYZ space view for illustrating an example of a correspondence relationship of arrangement positions of a virtual space and a real space.
Figure 3B:
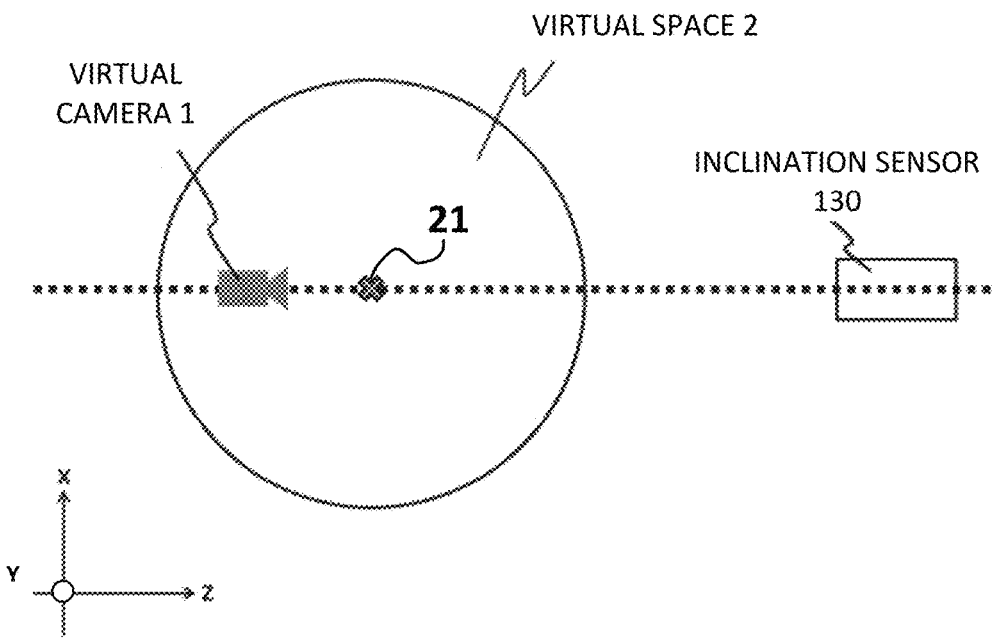
FIG. 3B An XZ plane view for illustrating an example of the correspondence relationship of the arrangement positions of the virtual space and the real space.

A function of detecting the information relating to the position and the movement of the HMD 110 with use of the inclination sensor 130 is referred to as "position tracking". The relationship between the position tracking performed by the inclination sensor 130 and a virtual camera 1 arranged in a virtual space 2 is described with reference to FIG. 3A and FIG. 3B. In order to describe the positional relationship between the virtual camera 1 and the sensor 130, in the following, the position of the sensor 130 is set as a position of the detection unit 132 when the detection unit 132 is provided, and is set as the position of the sensor unit 114 when the detection unit 132 is not provided. FIG. 3A is a schematic three-dimensional view for illustrating the relationship between the virtual space 2 and the inclination sensor 130 in the real space, and FIG. 3B is a plan view for illustrating the relationship between the virtual space 2 and the sensor 130 in the real space as viewed from the Y direction. The virtual camera 1 is arranged inside the virtual space 2, and the inclination sensor 130 is virtually arranged outside of the virtual space 2 (in the real space).

The virtual space 2 is formed into a celestial sphere shape having a plurality of substantially-square or substantially-rectangular mesh sections 3. Each mesh section is associated with space information of the virtual space 2, and, as described later, a field-of-view image is formed and a field-of-view region is defined based on this space information. In at least one embodiment, as illustrated in FIG. 3B, in an XZ plane, a center point 21 of the celestial sphere is adjusted to always be arranged on a line connecting between the virtual camera 1 and the sensor 130. For example, when the user wearing the HMD moves, and thus the position of the virtual camera 1 moves in the X direction, the region of the virtual space 2 is changed such that the center 21 is positioned on the line segment between the virtual camera 1 and the inclination sensor 130.

The HMD system 100 may include headphones including a microphone in any of the elements. With this, the user can give audible instructions to a predetermined object in the virtual space. Further, the HMD system 100 may include a television receiver in any of the elements in order to receive a broadcast of a television program on a virtual television in the virtual space. Further, as described later, the HMD system 100 may have a communication function or the like in order to display an electronic mail or the like that the user has acquired.

Figure 4:
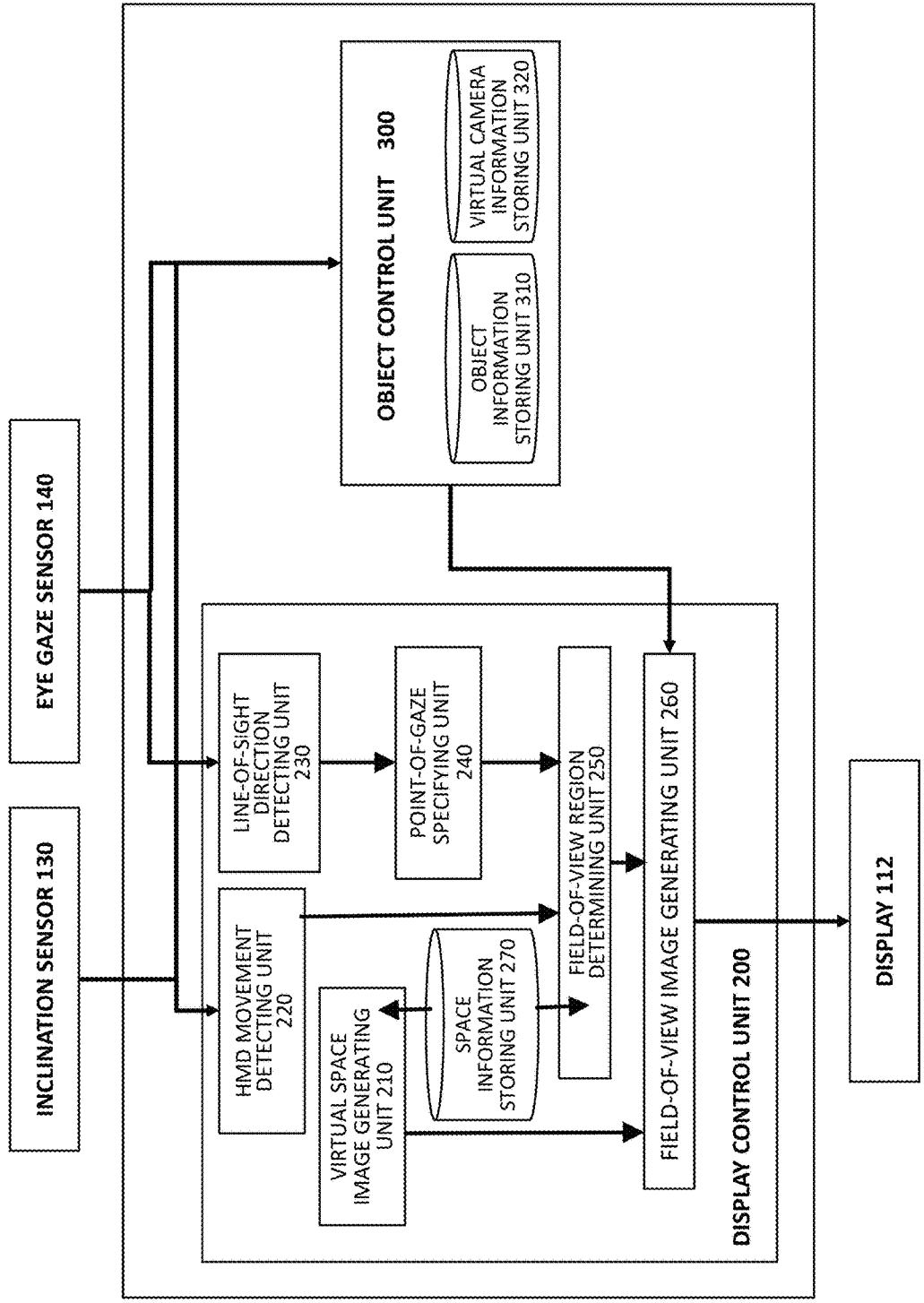
FIG. 4 A block diagram for illustrating a function of a control circuit unit, for achieving a function of the HMD system according to at least one embodiment.

FIG. 4 is a diagram for illustrating the function of the control circuit unit 120 for achieving display processing of the virtual space 2 in the HMD system 100 and operations of various menu displays and objects to be displayed in the virtual space 2. The control circuit unit 120 is configured to control an image to be output to the display 112 based on the input from the inclination sensor 130 and the eye gaze sensor 140.

The control circuit unit 120 includes a display control unit 200 and an object control unit 300. The display control unit 200 includes a virtual space image generating unit 210, an HMD movement detecting unit 220, a line-of-sight direction detecting unit 230, a point-of-gaze specifying unit 240, a field-of-view region determining unit 250, a field-of-view image generating unit 260, and a space information storing unit 270. The object control unit 300 includes an object information storing unit 310 and a virtual camera information storing unit 320.

The inclination sensor 130 and the eye gaze sensor 140 are each connected to the display control unit 200 and the object control unit 300 so as to enable communication therebetween, and may be connected via a wired or wireless communication interface. The display control unit 200 and the object control unit 300 are connected to the display 112 so as to enable communication therebetween, and may be connected via a wired or wireless communication interface. The space information storing unit 270, the object information storing unit 310, and the virtual camera information storing unit 320 include various types of data for providing, to the display 112, output information corresponding to the input from the inclination sensor 130 and the eye gaze sensor 140.

The inclination sensor 130 is configured to output, to the display control unit 200 and the object control unit 300, the information relating to the position and the movement of the HMD 110 based on the angle information that is detected over time by the sensor unit 114. The information relating the position and movement of the HMD 1100 is also based on the angle information of the HMD 110, which is detected over time by the detection unit 132.

The virtual space image generating unit 210 is configured to read, from the space information storing unit 270, information relating to the virtual space 2 to which the user is immersed, to thereby generate a virtual space image. The virtual space image is a 360-degree panoramic image for forming a predetermined game space independent of a line-of-sight direction of the user. The virtual space image is formed to have an image quality lower than that of the field-of-view image that is within a determined field of view of the user. The virtual space image may have, for example, a rendering level of about 30% of that of the field-of-view image, and may be achieved by, for example, reducing a polygon count for forming the field-of-view image.

The HMD movement detecting unit 220 is configured to detect the movement of the HMD 110 based on the input information from the inclination sensor 130. Further, the HMD movement detecting unit 220 is configured to detect a field-of-view direction for defining the direction of the HMD 110 in the virtual space 2. Further, the HMD movement detecting unit 220 is configured to output the detected field-of-view direction to the field-of-view region determining unit 250.

The line-of-sight direction detecting unit 230 is configured to detect directions of the lines of sight of the user's right and left eyes based on the input information from the eye gaze sensor 140. The point-of-gaze specifying unit 240 is configured to specify the point of gaze at which the user focuses his/her gaze based on the user's line-of-sight information from the eye gaze sensor 140.

Figure 5:
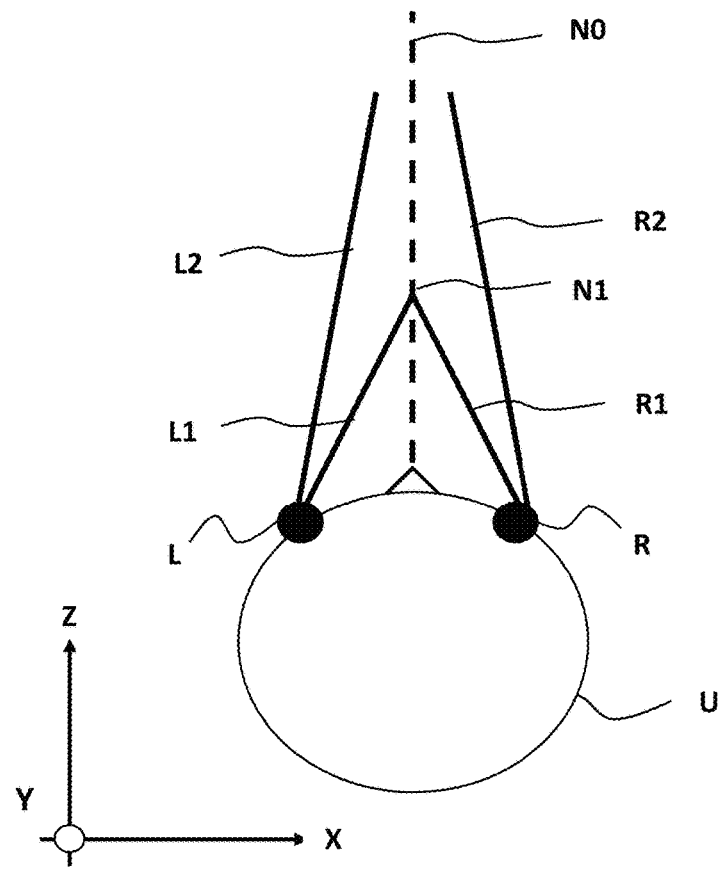
FIG. 5 A diagram for illustrating at least one example of a method of determining a line-of-sight direction.

As illustrated in FIG. 5, the eye gaze sensor 140 detects the directions of the lines of sight of the right and left eyes of a user U. When the user U is looking at a near place, lines of sight R1 and L1 are detected, and a point of gaze N1 being an intersection of the lines of sight R1 and L1 is specified. Further, when the user is looking at a far place, lines of sight R2 and L2, which form smaller angles with the Z direction as compared to the lines of sight R1 and L1, are specified. After the point of gaze N1 is specified, a line-of-sight direction NO of the user U is specified. The line-of-sight direction NO is a direction in which the line of sight of the user U is actually directed with both eyes. The line-of-sight direction NO is defined as, for example, an extension direction of a straight line that passes through the point of gaze N1 and the middle of a right eye R and a left eye L of the user U.

The field-of-view region determining unit 250 is configured to determine the field-of-view region of the virtual camera 1 in the virtual space 2 based on the virtual space information stored in the space information storing unit 270 and on the input information from the inclination sensor 130 and the eye gaze sensor 140. The field-of-view image generating unit 260 is configured to generate, as a field-of-view image, a part of the 360-degree panoramic image forming the virtual space, based on the information relating to the field-of-view region. The field-of-view image is output to the display 112. The field-of-view image includes two two-dimensional images for the left eye and the right eye, and those images are superimposed on the display 112, to thereby provide the virtual space 2 being a three-dimensional image to the user.

Figure 6A:
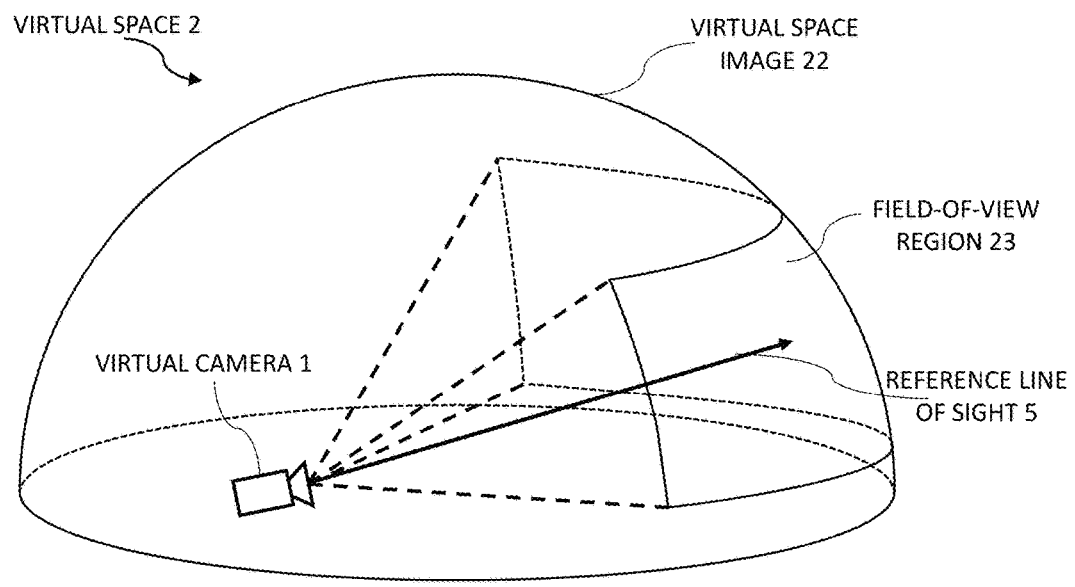
FIG. 6A A schematic three-dimensional view for illustrating a field-of-view region.

Referring to FIG. 6A to FIG. 6C, a field-of-view region 23, which is determined by the field-of-view region determining unit 250 along the celestial sphere surface of the virtual space 2, is described. FIG. 6A is a schematic three-dimensional view for illustrating the field-of-view region 23. FIG. 6B is a YZ plane view of the field-of-view region 23 as viewed from the X direction. FIG. 6C is an XZ plane view of the field-of-view region 23 as viewed from the Y direction. As illustrated in FIG. 6A, the field-of-view region 23 forms a part of a virtual space image 22. The field-of-view region 23 is, as described later, a part of the virtual space image 22 forming the field of view of the user. The field-of-view region 23 is determined based on a reference line of sight 5, and the reference line of sight 5 is determined based on the position and the direction of the virtual camera 1. In at least one embodiment, the reference line of sight 5 is defined based on at least one of the field-of-view direction defining the direction of the HMD 110, or the line-of-sight direction NO specified by the eye gaze sensor 140.

The field-of-view region 23 has a first region 24 (see FIG. 6B) that is a range defined by the reference line of sight 5 and a YZ cross section of the virtual space image 22, and a second region 25 (see FIG. 6C) that is a range defined by the reference line of sight 5 and an XZ cross section of the virtual space image 22. The first region 24 is set as a range including a polar angle $\alpha$ with the reference line of sight 5 being the center. The second region 25 is set as a range including an azimuth $\beta$ with the reference line of sight 5 being the center.

Figure 7:
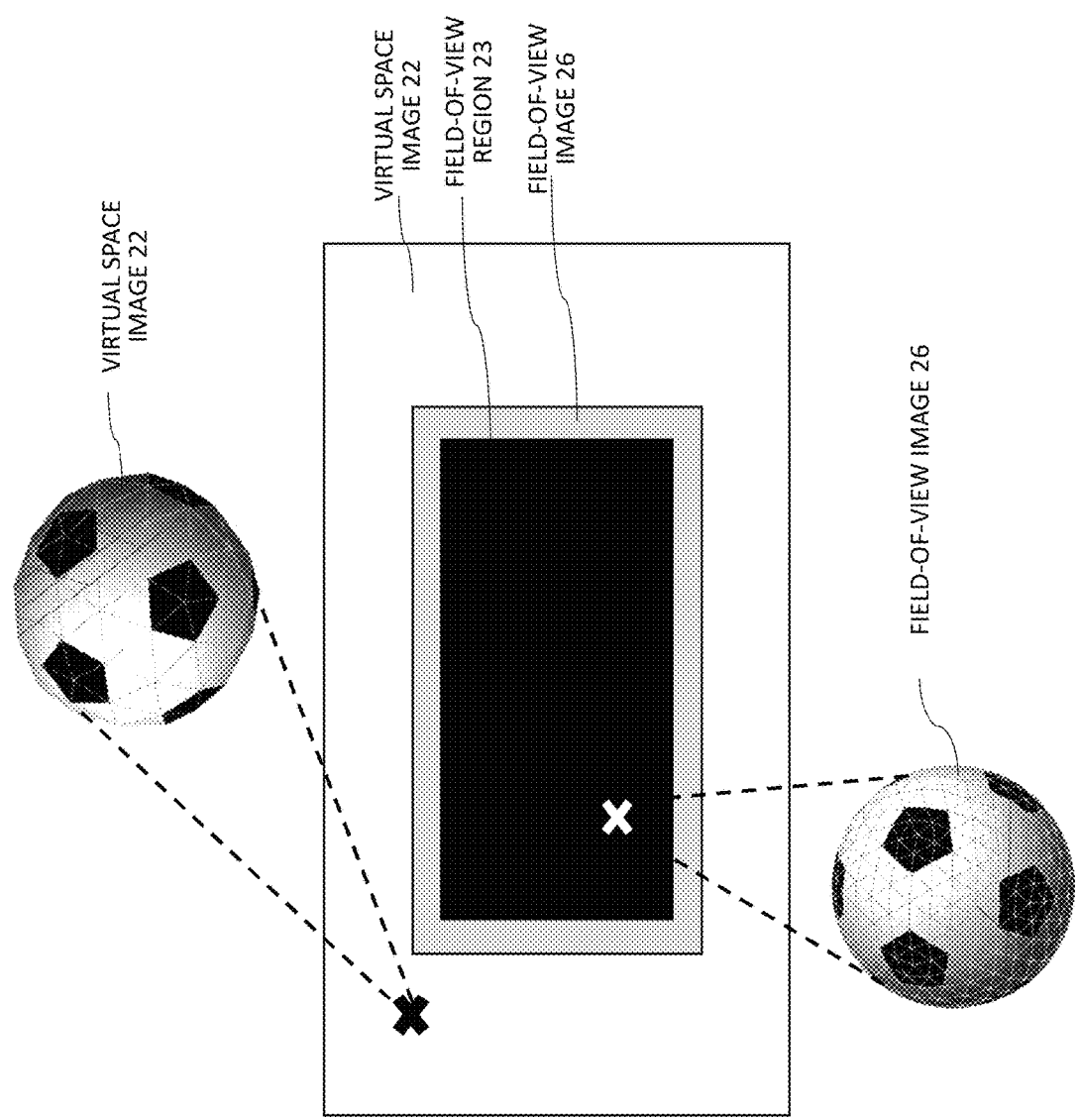
FIG. 7 A diagram for illustrating a field-of-view image according to at least one embodiment.

The field-of-view image generating unit 260 is configured to generate a region of the virtual space image 22 formed in advance corresponding to the field-of-view region 23 as a field-of-view image 26 having an image quality higher than that of the virtual space image 22. The field-of-view image 26 is an image forming a space that is actually visually recognized by the user in the virtual space 2. FIG. 7 is a diagram for illustrating a state in which the field-of-view image 26 is generated based on the field-of-view region 23. In at least one embodiment, the field-of-view image 26 is generated so as to cover a predetermined region around the field-of-view region 23. Further, the field-of-view image 26 is generated as an image having an image quality higher than that of the virtual space image 22, in at least one embodiment. Specifically, the higher image quality may be obtained as follows. As illustrated in FIG. 7, in at least one embodiment, the polygon count of the image forming the field-of-view image 26 is increased to be higher than that of the image forming the virtual space image 22, to thereby increase the rendering level. Otherwise, in at least one embodiment, the virtual space image 22 is subjected to texture mapping.

The object control unit 300 is configured to specify an object to be operated based on information on the object in the virtual space, which is stored in the object information storing unit 310, and on the user instruction from the inclination sensor 130 and the eye gaze sensor 140. Then, the virtual camera information stored in the virtual camera information storing unit 320 is adjusted based on a predetermined user operation instruction to the object to be operated. The adjusted virtual camera information is output to the display control unit 200, and thus the field-of-view image is adjusted. Further, an operation corresponding to the predetermined user operation instruction is executed to the object to be operated, and the object control information is output to the display 112 and the display control unit 200. Specific processing of the object operation is described later.

A hardware element for achieving each function of the control circuit unit 120 can be constructed of a CPU, a memory, and other integrated circuits. Further, each function is achieved by various programs serving as software elements loaded in the memory. Therefore, a person skilled in the art would understand that those functional blocks can be achieved by hardware, software, or a combination thereof.

Figure 8:
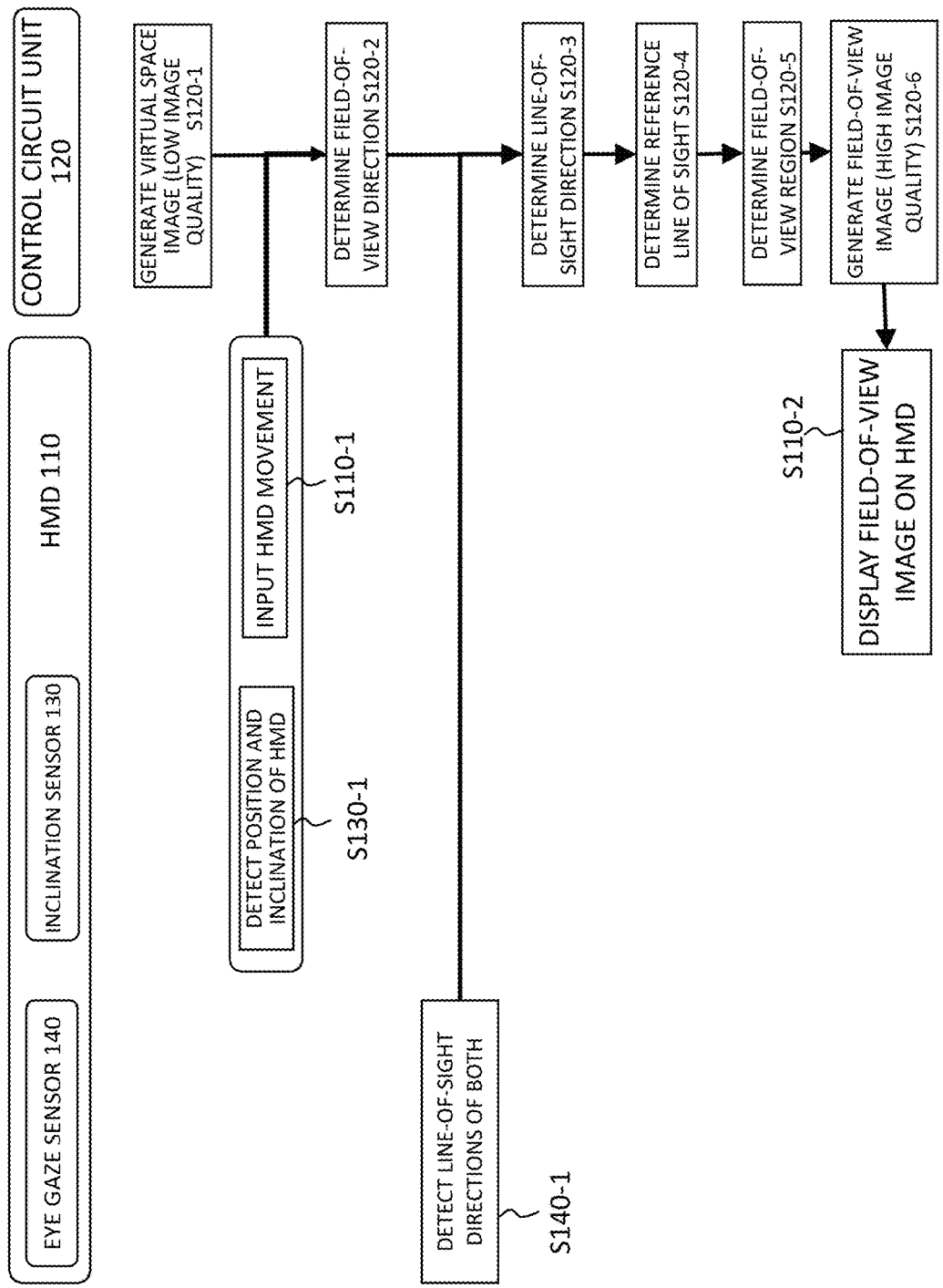
FIG. 8 A flow chart for illustrating processing for achieving the function of the HMD system according to at least one embodiment.
Figure 9:
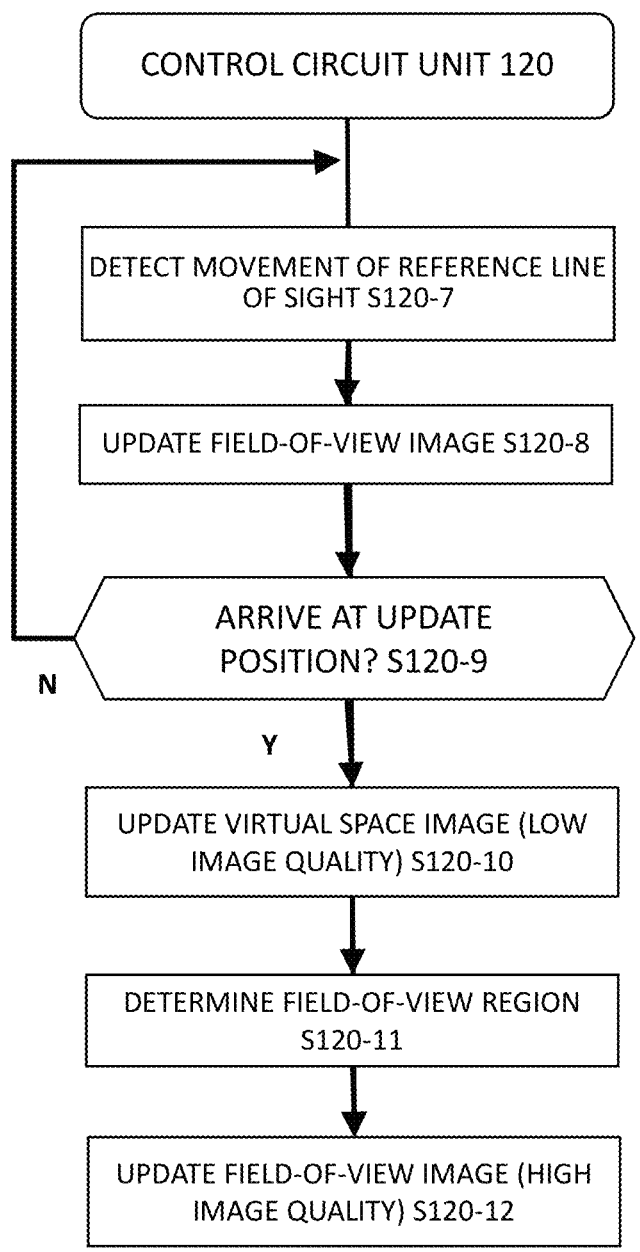
FIG. 9 A flow chart for illustrating processing for achieving the function of the HMD system according to at least one embodiment.

Referring to FIG. 8 and FIG. 9, description is given of a processing flow of the HMD system 100, for generating the field-of-view image 26 based on the virtual space image 22 and the reference line of sight 5. The field-of-view image generation processing may be achieved by the interaction between the HMD 110 (eye gaze sensor 140, inclination sensor 130) and the control circuit unit 120.

The control circuit unit 120 (virtual space image generating unit 210) generates the virtual space image 22 in order to provide the virtual space 2 to which the user is immersed (S120-1). When an operation, e.g., movement or inclination, is input to the HMD from the user (S110-1), the inclination sensor 130 detects the position and the inclination of the HMD 110 (S130-1). The detection information of the inclination sensor 130 is transmitted to the control circuit unit 120, and the HMD movement detecting unit 220 determines the position information and the inclination information of the HMD 110. With this, the field-of-view direction is determined based on the position information and the inclination information of the HMD 110 (S120-2).

When the eye gaze sensor 140 detects the movement of the eyeballs of the user's right and left eyes (S140-1), the information is transmitted to the control circuit unit 120. When the line-of-sight direction detecting unit 230 of the control circuit unit 120 specifies the lines of sight of the right and left eyes, the point-of-gaze specifying unit 240 specifies the user's point of gaze, to thereby specify the line-of-sight direction.

The field-of-view region determining unit 250 specifies the reference line of sight 5 based on the field-of-view direction or the line-of-sight direction (S120-4). The field-of-view region determining unit 250 determines the field-of-view region 23 (first region 24 and second region 25) based on the reference line of sight 5 (S120-5). The field-of-view image generating unit 260 generates the field-of-view image 26 based on the field-of-view region 23 (S120-6). As described above, the field-of-view image 26 is generated by increasing the image quality of a region of the virtual space image 22 corresponding to the field-of-view region 23. The HMD 110 receives the information relating to the field-of-view image 26 from the control circuit unit 120, and causes the display 112 to display the field-of-view image 26 (S110-2). A state in which the field-of-view image 26 is generated in a part of the virtual space image 22 as described above is illustrated in FIG. 10.

As illustrated in FIG. 9, when the user inputs an operation of moving the reference line of sight 5 to the HMD 110 or the eye gaze sensor 140, the control circuit unit 120 detects the movement of the reference line of sight 5 (S120-7), and updates the field-of-view image 26 (S120-8). With this, the user can visually recognize the updated field-of-view image 26, and can obtain a sense of immersion in the virtual space 2.

Figure 10:
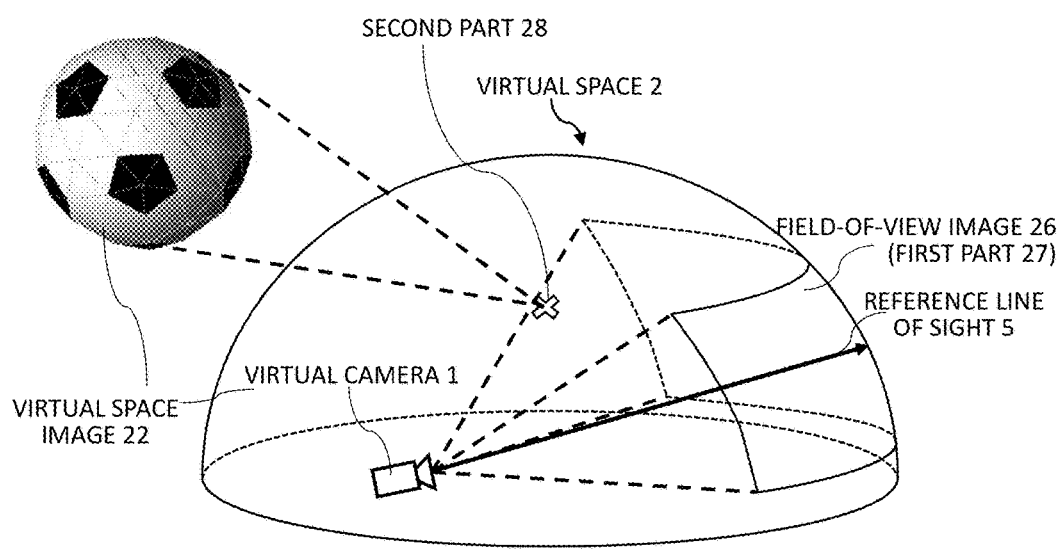
FIG. 10 A diagram for illustrating a field-of-view image according to at least one embodiment.
Figure 11:
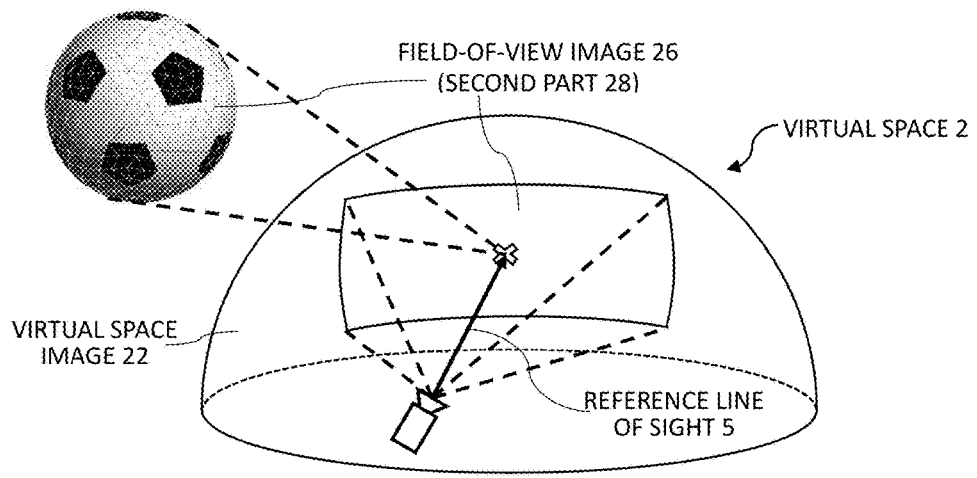
FIG. 11 A diagram for illustrating a field-of-view image according to at least one embodiment.

At this time, the field-of-view image 26 moves from a first part 27 illustrated in FIG. 10 to a second part 28 illustrated in FIG. 11. The virtual space image 22 in the second part 28 is generated as the field-of-view image 26 due to the movement of the reference line of sight 5 by the user described above. In at least one embodiment, the virtual space image 22 in the second part 28 is generated as the field-of-view image 26 before completion of the movement from the first part to the second part of the field-of-view region 23 due to the movement of the reference line of sight 5. With this, the user can always visually recognize the virtual space 2 having a high image quality, and the user experience can be improved.

Figure 12:
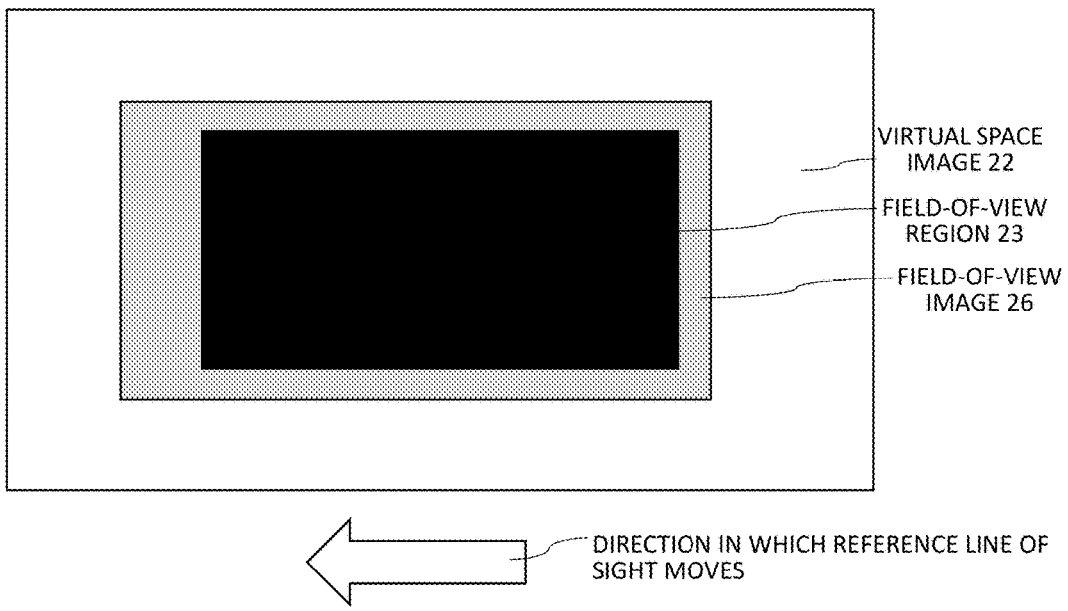
FIG. 12 A diagram for illustrating a field-of-view image according to at least one embodiment.

The field-of-view image 26 is generated so as to cover a predetermined region around the field-of-view region 23. In at least one embodiment, as illustrated in FIG. 12, the predetermined region is set so as to be increased toward the direction in which the reference line of sight 5 moves. In the direction in which the reference line of sight 5 moves, the field-of-view image 26 having a high image quality is generated in advance in a wide range. Thus, before completion of the movement of the field-of-view region 23, the field-of-view image 26 of the region can be easily generated.

Figure 13:
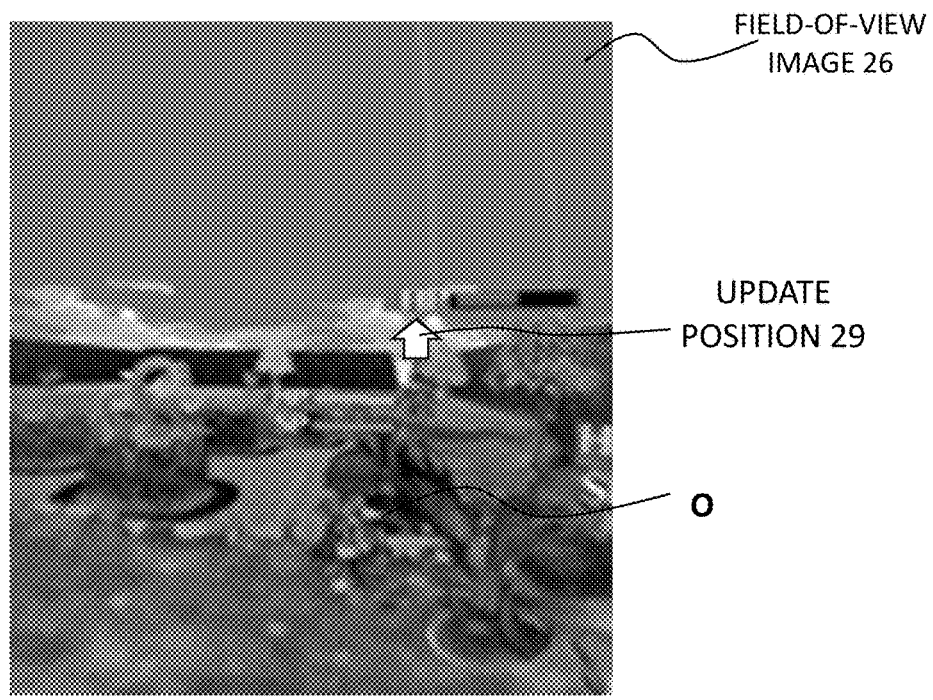
FIG. 13 A diagram for illustrating at least one example of the field-of-view image when a game stage is updated.

Further, when the HMD 110 detects the movement of the position of the user in the virtual space 2, whether or not the user has arrived at an update position is determined (S120-9). FIG. 13 is an illustration of an example of the field-of-view image 26 including an update position 29. The user can operate the HMD 110 and the external controller, to thereby operate an object (game character) O, in at least one embodiment. The field-of-view image 26 in FIG. 13 is a part of the virtual space image 22 forming a predetermined game stage. The user operates the object O to cause the object O to arrive at the update position 29, and thus the game stage can proceed to the next stage.

After the game stage proceeds to the next stage, the virtual space image 22 is updated to a virtual space image 22 corresponding to the game stage (S120-10). The virtual space image 22 is generated as an image having an image quality lower than that of the field-of-view image 26 that is visually recognized by the user. Next, similarly to the above-mentioned processing flow, the field-of-view region 23 is determined based on the reference line of sight 5 of the user (S120-11), and a region of the virtual space image 22 corresponding to the field-of-view region 23 is generated as the field-of-view image 26 having a high image quality (S120-12). Thus, the update of the game stage is completed. In this process, when the position of the user in the virtual space 2 arrives at the update position 29, the virtual space image 22 is collectively updated. With this, the virtual space image 22 can be generated efficiently, and the rendering load can be reduced.

The embodiment of this disclosure is described above. However, this disclosure is not limited to the embodiments described above. A person skilled in the art would understand that various modifications may be made to the embodi-

The invention claimed is:

1. A method for controlling an immersive head mounted display (HMD) configured to provide a virtual space to a user, the method comprising:
   generating and storing virtual space image data having a first image quality, wherein the virtual space image data is usable for forming a virtual space viewable by the user;
   generating a virtual space image, wherein generating the virtual space image comprises reading the previously stored virtual space image data;
   determining a reference line of sight;
   determining a field-of-view region of the virtual space based on the reference line of sight; and
   generating, using a computer, in the field-of-view region, a field-of-view image having a second image quality higher than the first image quality,
   wherein generating the virtual space image further comprises reducing a 3D polygon count as compared to the field-of-view image, and
   wherein generating the field-of-view image comprises increasing the 3D polygon count of the virtual space image,
   wherein the field-of-view image corresponds in size to the field-of-view region,
   wherein the virtual space image outside of the field-of-view region is not visible to the user, and
   wherein the virtual space image is generated outside the field-of-view region simultaneously with the generating of the field-of-view image.

2. The method for controlling the HMD according to claim 1, further comprising detecting a direction in which the reference line of sight moves,
   wherein, when the field-of-view region moves from a first part to a second part of the virtual space image due to movement of the reference line of sight, the field-of-view image is generated in the second part prior to completion of movement of the field-of-view region.

3. The method for controlling the HMD according to claim 1, wherein the field-of-view image is generated so as to cover a predetermined region around the field-of-view region.

4. The method for controlling the HMD according to claim 3, further comprising detecting a direction in which the reference line of sight moves,
   wherein the predetermined region is set to increase in the direction in which the reference line of sight moves.

5. The method for controlling the HMD according to claim 1, wherein the virtual space image is a 360-degree panoramic image forming a predetermined game space independent of the line-of-sight.

6. A method for controlling an immersive head mounted display (HMD) configured to provide a virtual space to a user, the method comprising:
   generating and storing virtual space image data having a first image quality;
   generating a virtual space image, based on the virtual space image data;
   determining a reference line of sight;
   determining a field-of-view region of the virtual space based on the reference line of sight; and
   generating, using a computer, in the field-of-view region, a field-of-view image having a second image quality higher than the first image quality,
   wherein the field-of-view image is generated by subjecting the virtual space image to texture mapping, wherein
   the virtual space image is a 360-degree panoramic image forming a predetermined game space independent of the line-of-sight,
   the virtual space image outside of the field-of-view region is not visible to the user,
   the field-of-view image corresponds in size to the field-of-view region, and
   the virtual space image is generated outside the field-of-view region simultaneously with the generating of the field-of-view image.

7. The method for controlling the HMD according to claim 6, further comprising detecting a direction in which the reference line of sight moves,
   wherein, when the field-of-view region moves from a first part to a second part of the virtual space image due to movement of the reference line of sight, the field-of-view image is generated in the second part prior to completion of movement of the field-of-view region.

8. The method for controlling the HMD according to claim 6, wherein the field-of-view image is generated so as to cover a predetermined region around the field-of-view region.

9. The method for controlling the HMD according to claim 8, further comprising detecting a direction in which the reference line of sight moves,
   wherein the predetermined region is set to increase in the direction in which the reference line of sight moves.

10. A system for controlling an immersive head mounted (HMD), wherein the system comprises:
    memory configured to store instructions; and
    a computer connected to the memory, wherein the computer is configured to execute the instructions for:
       generating and storing virtual space image data, corresponding to a virtual space image, which has a first image quality and forms a virtual space viewable by the user;
       determining a reference line of sight;
       determining a field-of-view region of the virtual space based on the reference line of sight; and
       generating, in the field-of-view region, a field-of-view image having a second image quality higher than the first image quality,
    wherein the field-of-view image is generated by increasing a 3D polygon count of the virtual space image,
    wherein the field-of-view image corresponds in size to the field-of-view region,
    wherein the virtual space image outside of the field-of-view region is not visible to the user, and
    wherein the virtual space image is generated outside the field-of-view region simultaneously with the generating of the field-of-view image.

11. The method for controlling the HMD according to claim 10, wherein the virtual space image is a 360-degree panoramic image forming a predetermined game space independent of the line-of-sight.

* * * * *